United States Patent [19]

Albert et al.

[11] 4,438,344

[45] Mar. 20, 1984

[54] SWITCHED RECTIFIER DISC FOR EDISON SOCKETS

[75] Inventors: Donald Albert, Higganum; Anthony M. Tremaglio, Waterbury, both of Conn.

[73] Assignee: Miracle Products, Inc., Middlebury, Conn.

[21] Appl. No.: 381,957

[22] Filed: May 25, 1982

[51] Int. Cl.[3] .......................... H02J 1/00; H05B 37/02

[52] U.S. Cl. .................................. 307/146; 200/51.09; 315/362; 362/802

[58] Field of Search ................ 200/52 R, 51 R, 51.09; 307/146, 157; 362/802; 315/32, 71-75, 362

[56] References Cited

U.S. PATENT DOCUMENTS

| | | | |
|---|---|---|---|
| 2,158,851 | 5/1939 | Ceader | 200/51.09 |
| 2,158,862 | 5/1939 | Phelps | 200/51.09 |
| 2,170,317 | 8/1939 | Bussmann | 200/51.09 X |
| 2,688,669 | 9/1954 | Quill | 200/51.09 |
| 2,824,183 | 2/1958 | Marusco et al. | 200/51.09 |
| 3,215,891 | 11/1965 | Fritz et al. | 307/146 X |
| 3,818,153 | 6/1974 | Arvai | 200/DIG. 29 X |
| 4,229,680 | 10/1980 | Berlin, Jr. et al. | 307/146 X |

*Primary Examiner*—J. R. Scott
*Attorney, Agent, or Firm*—Sherman & Shalloway

[57] ABSTRACT

A disc designed to be placed between a light bulb and the bottom of a mating Edison socket into which the light bulb is screwed is capable of attenuating power by rectifying alternating current to the bulb in one mode and in another mode is capable of passing full current to the bulb. Thus, by lightly screwing the bulb into the socket, the bulb glows dimly, its power being supplied through the rectifier. When the bulb is more tightly screwed into the socket, the disc is compressed and the device applies full power to the bulb. The switching is accomplished by offsetting the rectifier and allowing pressure exerted between the light bulb's center contact and the bottom of the socket to operate a switching mechanism, preferably located at the center of the disc. The switching mechanism shunts the rectifier in the full-power mode of operation.

20 Claims, 4 Drawing Figures

SWITCHED RECTIFIER DISC FOR EDISON SOCKETS

BACKGROUND OF THE INVENTION

1. Field of the Invention

This invention relates to devices used to provide a dimming function for ordinary single filament incandescent light bulbs. It is specifically designed to fit into a screw-in light bulb socket such as an Edison socket, although, with appropriate dimensions, the device could be used for other screw-in sockets such as Mogul sockets and miniature sockets.

2. Description of the Prior Art

Screw-in sockets have been in common use, probably from the advent of Edison's first commercialization of his incandescent light bulb. At that time, i.e., in the early days of commercialization of electric power, Edison sockets were used not only for light bulbs, but also for "plugging in" other electrical appliances which were attached via line cords to Edison plugs. While blade or pin connectors are presently used for line cords, most incandescent light bulbs in the home are installed by screwing the bulb into an Edison socket or a similar screw-in socket.

Several devices are presently commercially available which control current for dimming light bulbs. One type of device, represented by U.S. Pat. Nos. 3,450,893; 3,818,263 and 3,823,339, uses a diode rectifier sandwiched between a pair of metal disc contacts. The contacts and rectifier are surrounded by a ring of insulating material which separates the contacts from each other and the socket's outer conductor. The assembly is placed in a lamp socket between the center conductor of a light bulb and the bottom conductor of the socket and operates by cutting off the top halves of AC line current. This simultaneously dims the bulb, reduces temperature and extends the bulb's lifetime.

Other commonly available devices have a male Edison connector on one end, a female Edison connector on the other end, and have dimmer and switching circuitry between the connectors. These devices are insertable into an Edison socket, with the bulb being separately inserted into the other end of the device. Thus, in the prior art, it has been necessary to have the bulb physically separate from the socket in order to provide a switchable dimmer circuit for a single-filament bulb.

In addition to the common four-position lamp switch for two-filament ("3-way") bulbs, special sockets are available which are capable of providing a dimmer function for a single filament bulbs. These, of course, have to be either provided with the lamp or installed by someone who has the knowledge necessary to attach the electrical wires to a lamp. While this is a simple mechanical operation, there are many people who cannot safely accomplish such a project. One available device, produced by Leviton, is insertable into a lamp's line cord by clamping onto the cord and is capable of switching the lamp between full power, off and rectifier-attenuated power. While the device is fairly simple to install, the installation is at least as permanent as the electric wire itself and is, of course, separate from the bulb.

The devices which use rectifiers take advantage of the incandescent lamp's positive temperature cooefficient of resistance. This enables the lamp to glow at partial power even though it has been deprived of a substantial portion of the AC current wave form. Applying the formula IE=W, the current at full power can be determined by:

$$I=W/E$$

where

I=current

E=voltage

W=power.

As an example, for a 60 watt bulb operating at 120 volts. the current would be:

$$I=60/120=0.5 \text{ amp.}$$

The resistance of such a bulb can be determined by Ohm's law, IR=E, or R=E/I.

In the specific example, the bulb's resistance at rated voltage would be:

$$R=120 \text{ v}/0.5 \text{ amps.}=240\Omega$$

When current is reduced, the PTC nature of the bulb's filament reduces resistance and thereby allows an amount of current to pass through the bulb proportionately greater than the percentage of voltage available. Thus, the amount of power consumed by the bulb when available current is reduced by AC rectification would be greater than that anticipated by the above formula because the bulb's resistance is less, causing the current to be greater than if the resistance were the same.

SUMMARY OF THE INVENTION

It is, accordingly, an object of the invention to provide a light bulb dimmer apparatus which is switchable and does not require a permanent installation. It is a further object to provide a switchable dimmer which is installable inside an Edison socket beneath a light bulb with a minimum of displacement of the light bulb. It is a further object to provide a dimmer switch which is controllable by partial rotation of the light bulb and which, therefore, does not require the user to locate a switch separate from the bulb.

It is the further object of the invention to provide a simplified switching device which is insertable into an Edison socket and which provides an incandescent bulb with attenuated power in one mode and with full power in a second mode.

Accordingly, the present invention presents such a switching device in which a diode is placed between a pair of metal discs, with the diode being away from the center of the discs. Insulation surrounds the edges of the discs and elastomeric insulation is placed between the discs to encapsulate the diode and separate the discs. In order to provide a switching function, a pressure switch is placed between the discs which, when the discs are compressed, connects the two discs. The diode also connects the two discs so that when the pressure switch is not closed, current can pass between the discs through the diode, thus providing the attenuated power.

FIG. *2a* shows the disc according to a preferred embodiment of the invention in place in an Edison socket, and in its current attenuation mode.

Figure 2A:
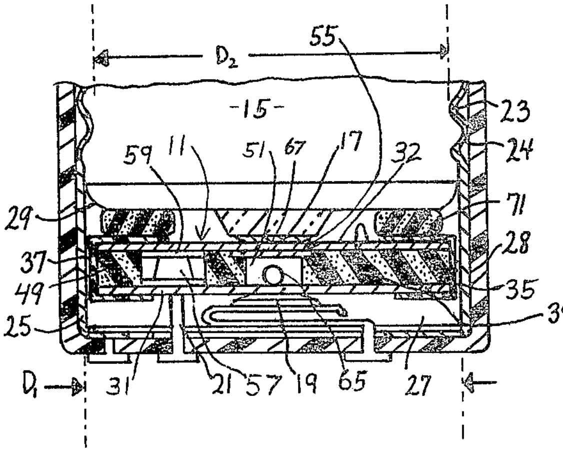
Figure 2B:
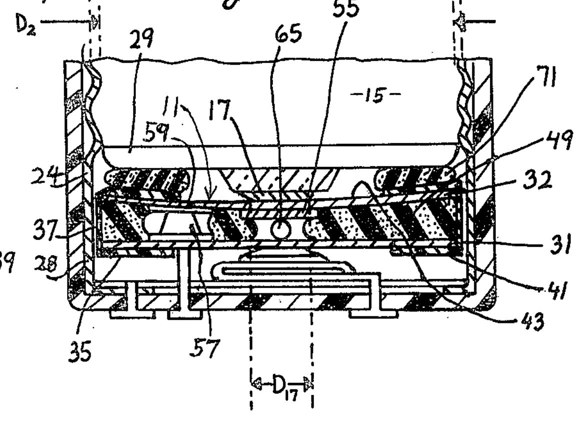

FIG. 2*b* shows the device of FIG. 2*a* in its full power mode of operation.

Figure 1:
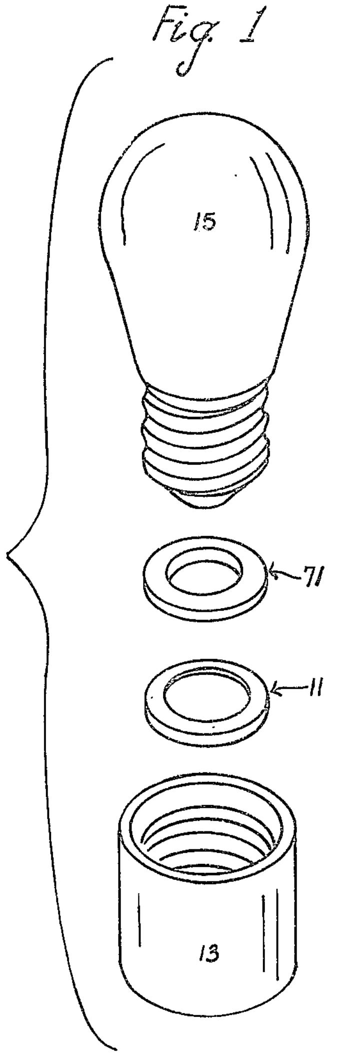
FIG. 1 is an assembly view, showing the switchable rectifier disc according to the invention being installed into service.
Figure 3:
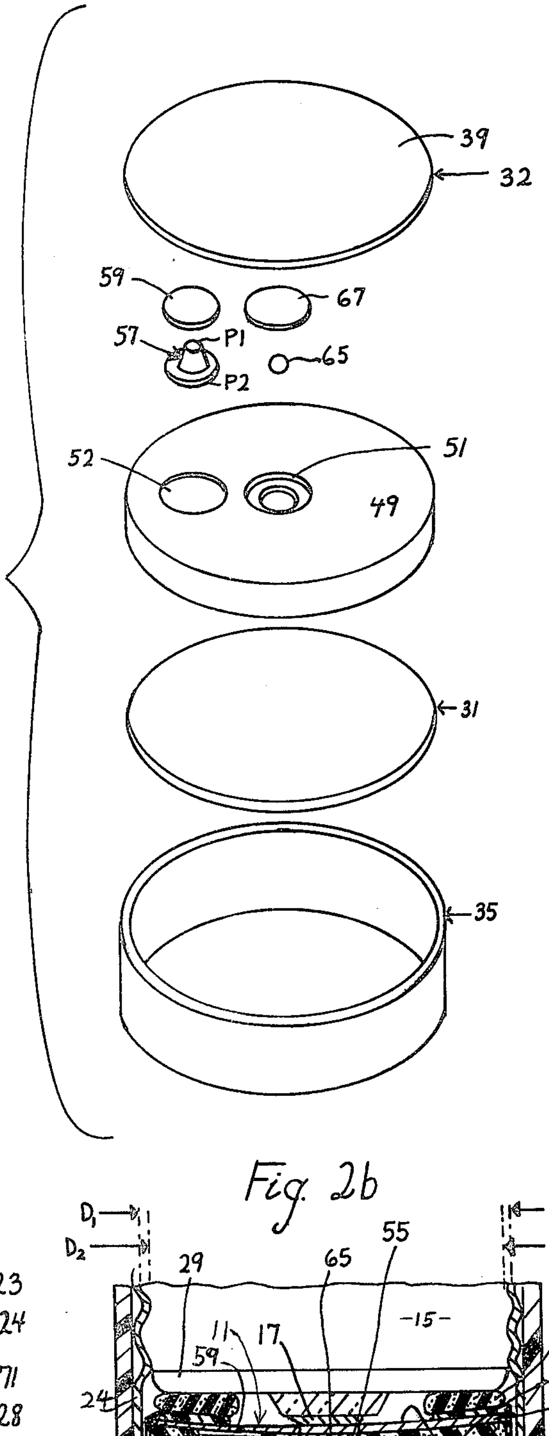

FIG. 3 is an assembly view of the disc of FIGS. 1, 2*a* and 2*b*.

DETAILED DESCRIPTION OF THE PREFERRED EMBODIMENTS

Referring to FIGS. 1, 2*a* and 2*b*, the device 11, according to the present invention, is inserted inside a female Edison socket 13 beneath a light bulb 15 intended to be screwed into the socket 13. As can be seen in FIG. 2*a* the device 11 rests in the socket 13 between the bulb's center contact 17 and the bottom contact 19 of the socket 13. In the event that the socket has two bottom contacts (for use with 3-way bulbs), the socket 13 would include the aforementioned bottom contact 19, as well as a secondary bottom contact 21. The secondary bottom contact 21 would probably also come into contact with the device 11 and the function of the device would be the same regardless of that contact's connection with the device 11. As is well known, the Edison socket 13 has a threaded portion 23, at least part of which forms an outer terminal 24 for contact with the bulb 15. It is acceptable within the design of Edison sockets to have an exposed conductor 25 extending from the socket's bottom 27 to the threaded portion 23 for convenience of manufacture. Usually the exposed conductor 25 also includes an unthreaded part 28 of the outer terminal 24. The light bulb's base 29 is designed so that at least the center contact 17 clears the exposed conductor 25 so as to avoid shorts.

Referring to FIGS. 2*a* and 3, the device 11 comprises first and second flat portions which form first and second planar contacts 31, 32. While the device 11 is reversible with respect to top and bottom, for simplicity of explanation, the first planar contact is shown as resting against the bottom contact 19 of the socket 13, with the second planar contact 32 being adjacent to the center contact 17 of the bulb 15. In order to prevent the device 11 from establishing electrical contact with the outer terminal 24, a plastic jacket 35 is provided around the perimeter of the device 11. It can thus be seen that the planar contacts 31, 32 each have outer surfaces 39 which are covered with the plastic jacket 35 near the perimeter 37 of the device 11. The outer surfaces 39 have exposed center portions 43.

While an Edison socket is being described, it is possible to operate the present device with other types of threaded light bulb sockets such as Mogul, miniature, and subminiature sockets, etc. While most of these different sockets require that the device 11 have different dimensions, the preferred dimensions for the device, as designed to fit an Edison socket, will be presently described. The inside diameter $D_1$ (shown in FIGS. 2*a* and 2*b* of the unthreaded part of the outer terminal 24 of most Edison sockets is approximately 28.6 mm or 1.125 inches. Subtracting from that diameter the dimensions of threads on each side, the clearance diameter $D_2$ for an unthreaded object to fit inside an Edison socket is approximately 25.4 mm or 1″. For this reason, the maximum diameter $D_2'$ of the device 11 is limited to approximately 25.4 mm. While, with the use of elastomeric materials, some leeway can be had for this maximum diameter $D_2'$, it is clear that the maximum diameter must be less than 26 mm. In order for the device 11 to properly operate, it must overlap the center contact 17 of the bulb 15. This center contact is typically at least 10 mm wide. Since the device 11 must be assumed to be able to slip within the bottom 27 of the socket 13, the (lateral) distance from the socket's diameter $D_1$ at its bottom 27 measured to the furthest point on a center contact 17 which is perfectly centered within the socket 13 would have to be less than a minimum diameter $D_{min}$ of the device 11. While not standardized, in most cases, the diameter of the socket 13 at the bottom 27 is approximately equal to the inside diameter $D_1$ of the unthreaded part 28 of the outer terminal 24. If the diameter of the center contact 17 is $D_{17}$, the minimum diameter $D_{min}$ of the device 11 can be determined on the basis of:

$$D_{min} > D_{17} + \frac{(D_1 - D_{17})}{2}$$

Gived the anticipated dimensions, $D_1 = 29$ and $D_{17} = 10$, $$D_{min} > 10 + \frac{(2a - 10)}{2}$$

$$= 19.5 \text{ mm, or approximately 20 mm}$$

It can thus be seen that the preferred dimension of the perimeter 37 of the device 11 is between 20 and 26 mm. Since, as we will see, it is necessary to provide a significant overlap for the edges 41 of the device 11, a preferred diameter of the device will be between 23 and 26 mm, with the ideal range for the outer diameter being from 24 to 25 mm.

The height of the device 11 (the distance between the outer surfaces 39 plus the additional dimensions of the plastic jacket 35) should be no greater than 10 mm because of the requirement that the socket 13 be able to grip the bulb 15 even with the device 11 at the bottom 27 of the socket 13. In the preferred embodiment, the height of the device 11 is less than 5 cm.

Referring to FIG. 3, the construction of the device 11 will now be described. Between the first and second planar contacts 31, 32, is an insulative foam spacer 49. The foam spacer 49 maintains the planar contacts 31, 32 separated from one another and provides a biasing force for reasons which will be described later. Because of its biasing action, the foam spacer 49 must be elastomeric. In one preferred embodiment, the foam spacer 49 is made of silicone foam, thus providing a capability of withstanding elevated temperatures resulting from current flowing through the device 11 and from the heat given off by the lamp.

The foam spacer 49 has two gaps 51, 52, 53, each of which extends completely between the first and second planar contacts 31, 32. The first gap 51 is located approximately at the center of the device 11 and houses a pressure switch 55 to be described later. The second gap 52 is located away from the center of the device 11 and houses a diode 57. The diode is electrically connected in series between the first and second planar contacts 31, 32, so that, absent shunting by the pressure switch 55, an AC voltage waveform applied across the planar contacts 31, 32 results in rectified current passing through the device 11. As shown in FIGS. 2*a*, 2*b* and 3 the diode 57 is provided with a shim 59 in order to maintain the diode 57 in electrical continuity with both planar contacts 31, 32. As is clear to those skilled in the art, the surface of the diode 57 contacting the first planar contact 31 must include one pole P1 and not the opposite pole P2. The surface of the diode 57 contacting the second planar contact 32 (or the shim 59) must be of the opposite pole P2 and not of the first pole P1. The diode 57 acts as a pivoting hinge for the planar contacts 31, 32 as they are compressed together with force applied to the outer surfaces 39 at the center of the device 11.

In the preferred embodiment, the pressure switch 55, located in the first gap 51, comprises a metal ball 65 loosely housed in the gap 51, between the first and second planar contacts 31, 32, as seen in FIG. *2a*. If necessary, one or more contact shims such as contact shim 67 may be provided. In addition to providing spacing, the contact shim 67 also serves as a contact point to prevent premature failure due to electrical switch contact erosion.

Referring to FIG. *2a*, once the device 11 is inserted into a suitable socket 13, the bulb 15 may be lightly screwed into the socket in order to effect contact with the device 11. The amount of torque applied in screwing in the bulb will be approximately equal to the torque necessary to install a light bulb without the device 11 being in the socket. The device 11 will, of course, slightly raise the height of the bulb 15 above the socket 13 by the amount of space taken up by the thickness of the device 11. Once the bulb 15 is inserted, with the device 11 in the socket, power is supplied through the socket in the normal fashion by switching "on" power. If the bulb 15 has been lightly screwed into the socket 13, the pressure switch 55 will remain open and current will be conducted from the bottom contact 19 of the socket 13 to the center contact 17 of the bulb 15 via the diode 57. This provides the light bulb 15 with current attenuated by rectification, as described above, thus causing the bulb to glow at reduced power, providing a reduced light output. If the bulb 15 is tightly screwed into the socket 13 the pressure switch 55 will be closed and the diode 57 will be shunted as shown in FIG. *2b*. In this case, full power will be conducted from the bottom contact 19 of the socket 13 to the bulb's center contact 17, thus causing the bulb to glow at full power. While current may also flow through the diode 57, the fact that the switch 55 is closed prevents the diode from blocking current by allowing current to bypass the diode 57, in a manner which should be clear to those skilled in the art.

It can therefore be seen that it is possible to control the illumination of the bulb by tightening and loosening the bulb 15 in the socket, as shown in FIGS. *2b* and *2a*, respectively.

If it is desired that the device 11 not be independently inserted into the socket, it is possible to provide a means for attaching the device 11 onto the bulb as shown in FIGS. 1, *2a* and *2b*. This may be accomplished by providing a double-stick foam washer 71 on the device 11. This secures the device 11 to the bulb 15 by preventing the device 11 from becoming too far separated from the bulb 15. Therefore, when the bulb 15 is removed from the socket 13, it is likely that the device 11 will remain attached to the bulb 15.

It is also possible to provide alternate types of pressure switches instead of pressure switch 55. One modified pressure switch (not shown) comprises a pair of opposed contactors. Each opposed contactor is positioned against the first and second planar contacts 31, 32, respectively. The contactors may be fixed to their respective planar contacts 31, 32 respectively either by pressure from the foam spacer 49 or by fusion bonding. In either case, the contactors form projections from the planar contacts 31, 32. A preferred method of securing the contactors to the planar contacts 31, 32 is by spot welding. The opposed contactors are spaced apart so that a moderate amount of pressure caused by the bulb 15 being screwed into the socket 13 allows the contactors to remain separate and an increased amount of pressure by more tightly screwing the bulb 15 into the socket 13 causes the opposed contactors to be brought together. As in the case with pressure switch 55, the increased pressure causes the modified pressure switch to close, thereby shunting the diode 57.

While the present invention has been shown and described in terms of specific embodiments, it has been anticipated that other changes may be made to the device without departing from the inventive features herein. For example, other forms of pressure switches may be substituted for pressure switch 55 or the modified pressure switch. Likewise, the exact positioning of the elements, such as the pressure, switch 55 and the diode 57, are not critical so long as pressure from the bulb 15 being screwed into the socket 13 effects a switching function. For this reason, the invention should be construed as limited by the following claims:

What is claimed is:

1. A switching device insertable into a current carrying light bulb socket, such as an Edison socket, below a light bulb for providing the bulb with attenuated power in a first mode and with full power in a second mode comprising:

(a) first and second electrically conductive planar contacts;

(b) an insulative spacer separating the first and second planar contacts, the insulative spacer being at least partially composed of elastomeric material;

(c) a means to secure the first and second planar contacts to the insulative spacer;

(d) a diode disposed between the first and second planar contacts so that, in the first mode, the diode is electrically in series with the planar contacts and all of said current passes through said diode; and (e) a pressure switching arrangement connected in series with the planar contacts and including switch means, whereby when the planar contacts are not compressed together, said switch means remains open and said first mode is established, and the switching arrangement closes when the planar contacts are compressed against the insulative spacer by a predetermined amount thereby closing said switch means to establish direct electrical continuity between the planar contacts, thereby providing two paths for said current to simutaneously take, one said path including said diode and another said path bypassing said diode, thereby establishing said second mode.

2. The device of claim 1 wherein protective electrical insulation is provided to prevent the planar contacts from establishing an electrical connection with the sides of the socket.

3. The device of claim 2 wherein the planar contacts are discs and the protective insulation encircles the device at the edges of the planar contacts.

4. The device of claim 1 wherein the diode is encapsulated in the insulative spacer.

5. The device of claim 1 wherein the diode is supported between the planar contacts away from the center of the device so that pressure exerted through the planar contacts on the insulative spacer by the light bulb being screwed into the socket is applied eccentrically of the diode, thereby resulting in a moment of force being applied to at least one of the planar contacts so that the planar contacts compress the insulative spacer nearer the center and remain in their approximate uncompressed condition near the diode, the compression of the insulative spacer near the center resulting in the pressure switching arrangement switching the device to the second mode.

6. The device of claim 5 wherein the pressure switching arrangement comprises an element surrounded by the insulative spacer, the element having a thickness less than the separation of the first and second planar contacts minus a thickness of any additional electrically conductive material or spacer located between the element and the planar contacts, the elements's thickness being nevertheless sufficient to establish electrical continuity between the first and second planar contacts when the planar contacts are compressed together by said pre-selected amount.

7. The device of claim 6 wherein the element is a ball.

8. The device of claim 5 wherein the pressure switching arrangement comprises at least one projection extending from the first planar contact toward the second planar contact, the thickness of the projection measured normal to the first planar contact being less than the separation of the first and second planar contacts, minus a thickness of any additional electrically conductive material located between the projection and the second planar contact, the projection's thickness being nevertheless sufficient to establish electrical continuity between the first and second planar contacts when the planar contacts are compressed together by a pre-selected amount.

9. The device of claim 1 wherein an insulative elastomeric foam washer is attached to one side of the device and is provided with an adhesive so that the device may be fixed to either a light bulb or the socket.

10. The device of claim 1 wherein the planar contacts are biased apart by the insulative spacer and the biasing causes the pressure switching arrangement to remain open until the planar contacts are compressed against the insulative spacer by the pre-selected amount.

11. The device of claim 1 wherein a portion of the insulative spacer is substantially non-elastomeric.

12. The device of claim 3 or 5 wherein the light bulb socket is an Edision socket.

13. An improved power attenuator device designed to be inserted between the bottom contact of a light bulb socket, such as an Edison socket, and a light bulb screwed into the socket, comprising a diode which is sandwiched between a pair of electrically conductive planar contacts and surrounded by a ring of insulating material bridging the contacts and integrating the diode and contacts to form the unit, with the diode dispoed between the two planar contacts so that the diode is in series with the two planar contacts and the position of the attnenuator in operation is such that it bridges a center contact of the bulb and a bottom contact of the socket in such a manner that no significant part of the center contact of the bulb is exposed to the socket, the improvement comprising:

(a) the diode being positioned eccentrically so that it is not directly under the center contact of the bulb;

(b) the planar contacts being compressible toward each other upon the application of force by screwing the light bulb into the socket; and (c) a pressure switching arrangement connected in series with the planar contacts which, when the planar contacts are not compressed together, remains open to provide a single current flow path through said diode and which closes when the planar contacts are compressed by screwing the bulb into the socket by a pre-determined amount, the closing of the switch establishing direct electrical continuity between the planar contacts while retaining said single current flow path.

14. The improved device of claim 13 wherein protective electrical insulation is provided to prevent the planar contacts from establishing an electrical connection with the sides of the socket.

15. The improved device of claim 13 wherein the pressure switching arrangement comprises an element surrounded by the insulative spacer, the element having a thickness less than the separation of the first and second planar contacts minus a thickness of any additional electrically conductive material or spacer located between the element and the planar contacts, the element's thickness being nevertheless sufficient to establish electrical continuity between the first and second planar contact when the planar contacts are compressed together by said pre-selected amount.

16. The device of claim 13 wherein the pressure switching arrangement comprises at least one projection extending from the first planar contact toward the second planar contact, the thickness of the projection measured normal to the first planar contact being less than the separation of the first and second planar contacts minus a thickness of any additional electrically conductive material located between the projection and the second planar contact, the projection's thickness being nevertheless sufficient to establish electrical continuity between the first and second planar contacts when the planar contacts are compressed together by a pre-selected amount.

17. The improved device of claim 13 wherein an insulative elastomeric foam washer is attached to one side of the device and is provided with an adhesive so that the device may be fixed to either a light bulb or the socket.

18. The device of claim 13 wherein the planar contacts are biased apart by the insulative spacer and the biasing causes the pressure switching arrangement to remain open until the planar contacts are compressed against the insulative spacer by the pre-selected amount.

19. The device of claim 1 wherein said switch means comprises:

(a) a hole in said insulative spacer forming with said planar contacts a switching chamber; and (b) an electrically conductive ball loosely held in said switching chamber of a diameter less than the thickness of said insulative spacer in a region thereof immediately surrounding said hole.

20. The device of claim 13, wherein said pressure switching arrangement includes:

(a) a hole in said insulating material forming with said planar contacts a switching chamber; and (b) an electrically conductive ball loosely held in said switching chamber of a diameter less than the thickness of said insulating material in a region thereof immediately surrounding said hole.

* * * * *

UNITED STATES PATENT AND TRADEMARK OFFICE
CERTIFICATE OF CORRECTION

PATENT NO. : 4,438,344

DATED : March 20, 1984

INVENTOR(S) : DONALD ALBERT, ET AL.

It is certified that error appears in the above—identified patent and that said Letters Patent is hereby corrected as shown below:

Column 7, line 46 (claim 13), delete "inproved", insert --improved--.

Column 7, line 53 (claim 13), delete "dispoed", insert --disposed--.

Signed and Sealed this

*Fourteenth* Day of *August 1984*

[SEAL]

*Attest:*

GERALD J. MOSSINGHOFF

*Attesting Officer* *Commissioner of Patents and Trademarks*